US010782400B2

(12) United States Patent
Aharoni et al.

(10) Patent No.: US 10,782,400 B2
(45) Date of Patent: Sep. 22, 2020

(54) IDENTIFICATION FRIEND OR FOE (IFF) SYSTEM AND METHOD

(71) Applicant: ISRAEL AEROSPACE INDUSTRIES LTD., Lod (IL)

(72) Inventors: Abraham Aharoni, Rehovot (IL); Roey Zuitlin, Kfar Ben-Nun (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 289 days.

(21) Appl. No.: 15/767,182

(22) PCT Filed: Sep. 25, 2016

(86) PCT No.: PCT/IL2016/051058
§ 371 (c)(1),
(2) Date: Apr. 10, 2018

(87) PCT Pub. No.: WO2017/064698
PCT Pub. Date: Apr. 20, 2017

(65) Prior Publication Data
US 2018/0299541 A1 Oct. 18, 2018

(30) Foreign Application Priority Data
Oct. 11, 2015 (IL) .......................................... 242004

(51) Int. Cl.
*G01S 13/86* (2006.01)
*G01S 17/06* (2006.01)
(Continued)

(52) U.S. Cl.
CPC ............ *G01S 13/865* (2013.01); *G01S 13/78* (2013.01); *G01S 17/06* (2013.01); *G01S 17/74* (2013.01)

(58) Field of Classification Search
CPC ........ G01S 13/865; G01S 17/06; G01S 17/74; G01S 13/78
See application file for complete search history.

(56) References Cited

U.S. PATENT DOCUMENTS 3,104,478 A * 9/1963 Strauss ................. F41G 3/2616
434/22
3,434,226 A * 3/1969 Schaller ................ F41G 3/2661
434/22
(Continued)

FOREIGN PATENT DOCUMENTS

DE 2251295 A1 5/1974
EP 614093 A1 9/1994
(Continued)

*Primary Examiner* — Bernarr E Gregory
(74) *Attorney, Agent, or Firm* — Browdy and Neimark, PLLC

(57) ABSTRACT

An Identification Friend or Foe (IFF) interrogation system and method adapted for: transmitting RF broadcast signal to be received by complementary transponder(s) of the IFF system being within the interrogation range and thereby arm the complementary transponders for sensing laser beam illumination; receiving an RF response signal from the complementary transponder(s); operating a laser activation interface module, which is configured for interfacing an external laser transmitter, to determine activation of transmission of an interrogating laser beam by the external laser transmitted; and receiving and processing RF signals to identify therein RF response signal(s), which are transmitted by the complementary IFF transponder(s) in response to detection of the trans mitted laser beam. In some implementations the complementary transponder is configured to encode, in the RF response signal, an identification code of the interrogator in the form of data indicative of a time pattern representing time interval(s) between the transmissions of the RF broadcast signal and the interrogating laser
(Continued)

beam. In turn, the interrogation system may be adapted to decode the identification code from the RF response signal and thereby determine whether the RF response signal is addressed thereto. In some cases where the laser beam of the external laser transmitter has a cross-sectional area smaller than the interrogation region, there is further provided a beam scattering directive providing instructions for directing the optical axis of the external laser transmitter towards light scattering surfaces in the vicinity of the interrogation region so it is illuminated by scattering of the laser beam by the scattering surfaces.

20 Claims, 9 Drawing Sheets

(51) Int. Cl.
  *G01S 17/74*    (2006.01)
  *G01S 13/78*    (2006.01)
  *G01S 13/00*    (2006.01)

(56) References Cited

U.S. PATENT DOCUMENTS

| | | | |
|---|---|---|---|
| 4,837,575 A * | 6/1989 | Conner, Jr. | G01S 13/78 342/45 |
| 5,001,488 A * | 3/1991 | Joguet | G01S 17/74 342/45 |
| 5,130,713 A * | 7/1992 | Wagner | G01S 13/865 342/45 |
| 5,170,168 A * | 12/1992 | Roth | G01S 13/78 342/45 |
| 5,274,379 A * | 12/1993 | Carbonneau | G01S 17/74 342/20 |
| 5,396,243 A * | 3/1995 | Jalink, Jr. | G01S 17/74 342/54 |
| 5,585,953 A * | 12/1996 | Zavrel | H04B 7/00 340/13.22 |
| 5,745,575 A | 4/1998 | Otto et al. | |
| 5,966,226 A * | 10/1999 | Gerber | G01S 17/74 398/108 |
| 7,308,202 B2 * | 12/2007 | Roes | G01S 17/74 398/108 |
| 8,068,013 B2 * | 11/2011 | Otsuka | G08C 17/02 340/10.5 |
| 8,125,371 B1 * | 2/2012 | Daniel | G01S 17/74 342/175 |
| 8,184,981 B2 * | 5/2012 | Ivtsenkov | G01S 17/74 342/45 |
| 2009/0045996 A1 | 2/2009 | Ivtsenkov et al. | |

FOREIGN PATENT DOCUMENTS

| | | |
|---|---|---|
| GB | 1426489 | 10/1973 |
| WO | 2014024196 A2 | 2/2014 |

* cited by examiner

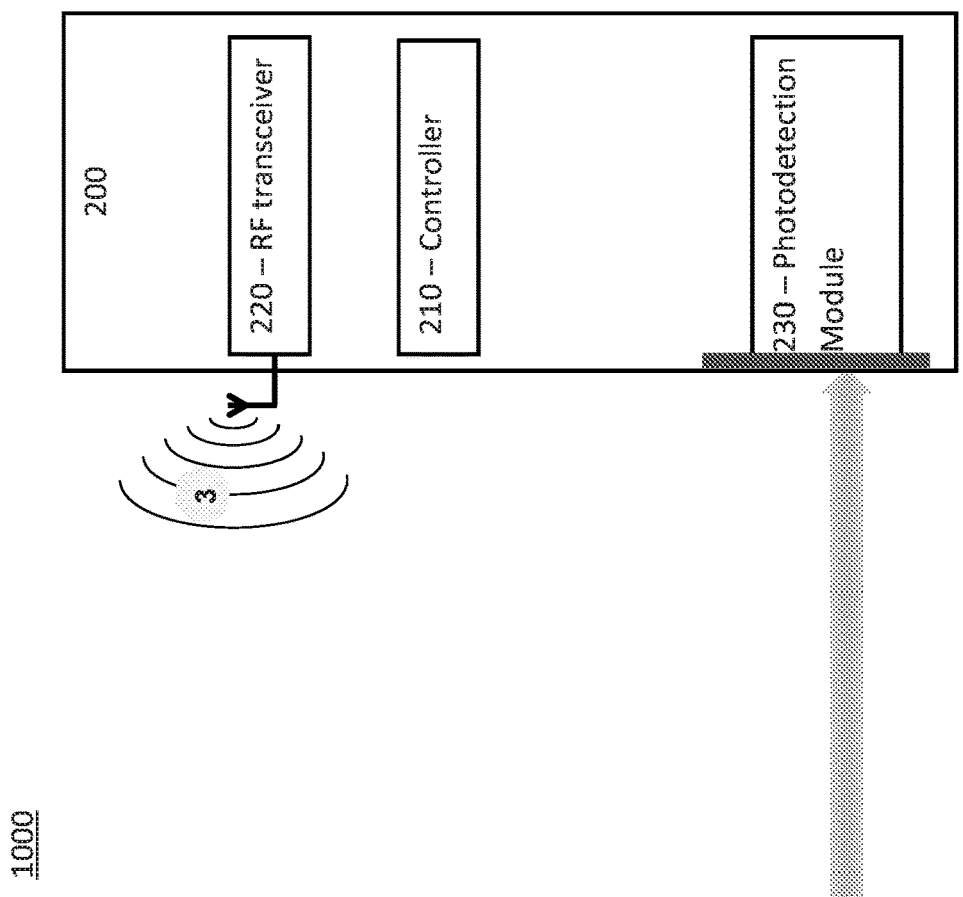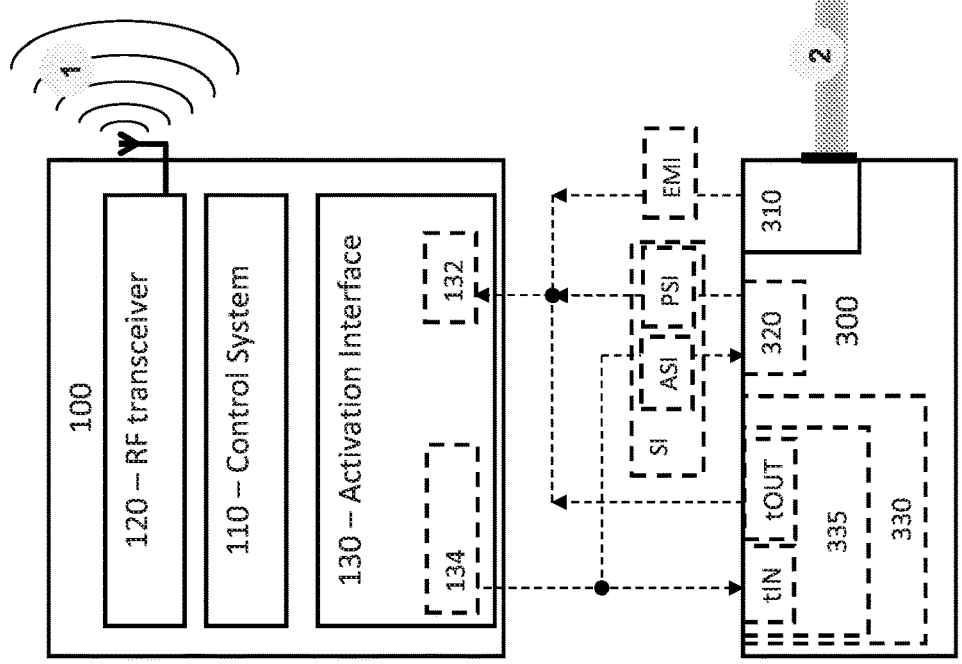
Fig. 2A

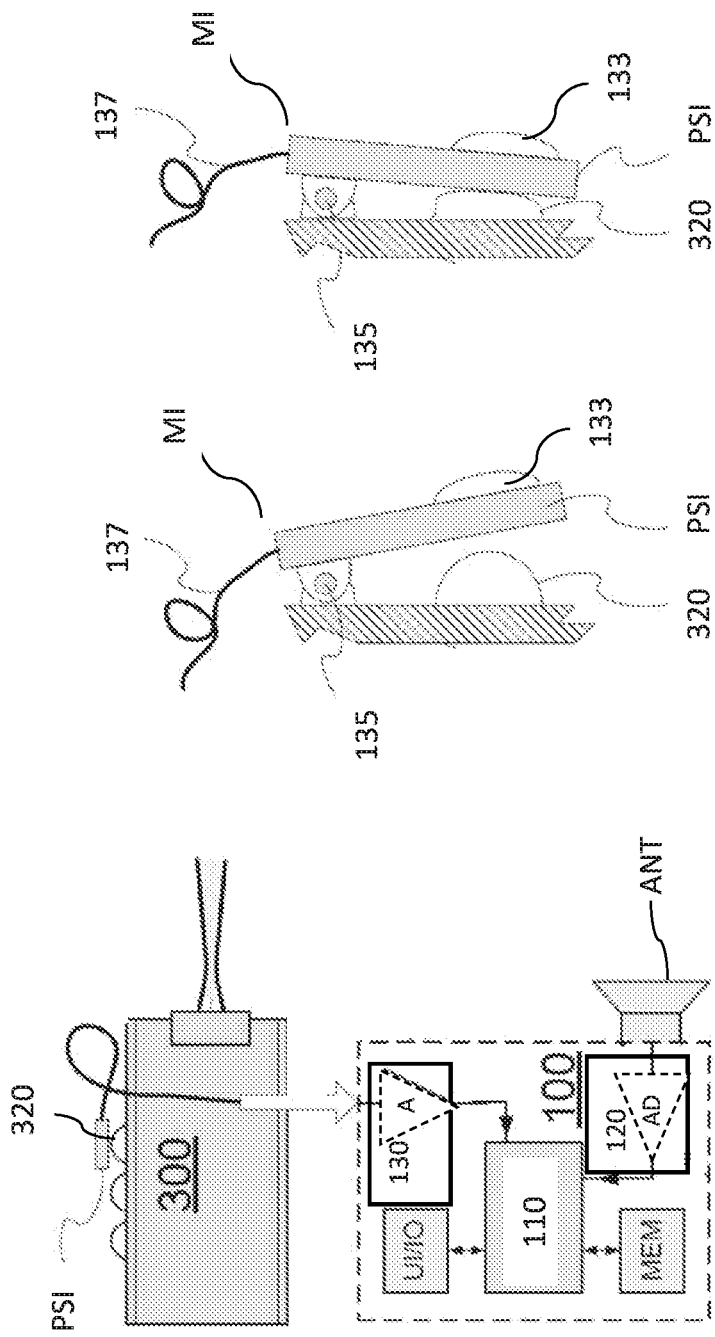

IDENTIFICATION FRIEND OR FOE (IFF) SYSTEM AND METHOD

TECHNOLOGICAL FIELD

The present invention is in the field of identification friend or foe systems and particularly relates to friend or foe identification systems which utilize optical beams for interrogating a region of interest.

BACKGROUND

Identification Friend or Foe (IFF) systems are used to detect and possibly identify friendly forces located in a region of interest. Identification Friend or Foe (IFF) systems typically include an interrogator module/system (hereinafter IFF interrogator) and complementary transponder module(s)/system(s) (hereinafter IFF transponder). According to some known techniques, the interrogator system transmits a relatively wide, coded interrogation optical beam, whose lateral width (diameter) is in the order of several meters to several tens of meters, towards the region of interest. The optical beam, commonly generated with a laser, illuminates the entire region of interest in which friendly forces, if located therein, should be detected. If transponder module(s) are located within the illumination region of the interrogating optical beam, they detect illumination of the optical beam, and, in response, transmit an RF signal acknowledging detection of the optical beam. Meanwhile, the interrogator system, after transmitting the optical beam, awaits for receipt of such acknowledging RF signals by its RF receiver/transceiver within a certain duration. The response may include the interrogator's identification code transmitted by the interrogating optical beam. Consequently, upon receipt of such acknowledging signals, the interrogator module may identify whether it was transmitted by an IFF transponder module of friendly forces and whether it was transmitted in response to the same interrogation optical beam that it had previously sent (or, for example, an interrogation by another IFF interrogator).

Such IFF systems and methods are described for example in PCT patent publications WO 2014/024196 assigned to the assignee of the present invention.

GENERAL DESCRIPTION

Conventional IFF systems used today require that a dedicated and specifically designed laser transmitter module be part of their IFF interrogator system. In this regard, even in cases where it is known that the IFF interrogator is going to be installed in the vicinity of other/external laser modules/transmitters, such as a laser-based range finder (LRF), still the conventional IFF systems are not configured to take advantage of such readily available external lasers and include, and make use of, an additional, dedicated laser transmitter.

The inventors of the present invention found that an interrogator system designed to use readily available external laser transmitters, such as an LRF, is advantageous over conventional IFF systems, in terms of size, weight and energy consumption of the interrogator system, as well as in terms of its cost effectiveness.

However, the inventors of the present invention have also noted that such marriage between an IFF system and an external range finder to utilize the latter in place of a dedicated laser within the IFF system is hindered by one or more of the following difficulties: (i) independent LRFs typically do not contain interfaces for external activation; it is therefore practically impossible to interface to the external laser module from conventional IFF systems, to activate it or determine its activation; (ii) LRFs typically use narrow laser beams to maximize the power of light reflected from a target towards which the range should be measured; This conflicts with the general requirement of IFF interrogators to illuminate a relatively large interrogation spot/area (illuminate/cover an interrogation spot width/diameter of several meters to tens of meters). Typically LRFs beams divergence is on the order of one mili-radian or less, so that the illumination spots on the target area are on the order of a meter or less at 1 Km, for example; (iii) In conventional IFF techniques the optical beam transmitted by the IFF interrogator is encoded with information indicative of the identification of the IFF interrogator transmitting it (so that the IFF transponder detecting the laser beam can verify that the interrogation is legitimate and encode the interrogator's identification code onto the RF acknowledgement signal it sends); However, LRFs typically use a single laser pulse, which make it practically impossible to transmit the interrogator's identification code over the its laser beam, thus prohibiting IFF transponder from verifying whether the interrogation is legitimate and encoding the interrogator's identification code onto the RF acknowledgement signal it sends).

The present invention provides a novel IFF system and method using novel IFF interrogators and IFF transponders which are configured and operable to enable exploiting external laser transmitters for generation of the interrogating laser beam instead of a dedicated and specifically designed laser transmitter in the IFF interrogator.

According to certain broad aspects, the system and methods of the present invention provide and enable interfacing to external laser transmitter(s), such as laser range finders, and use their output laser beams (which are pulsed laser beams, mostly comprising a single pulse) as IFF interrogation optical beams. Moreover, advantageously, according to some broad aspects, the system and methods of the invention are adapted to enable use of external laser transmitters which provide a narrow beams, (such as range finders, for whose laser beams are typically narrower by one or more orders of magnitude than the lateral width of a typical interrogation spot size to be generated by an IFF interrogator) and use the narrow laser beam for illuminating and interrogating the region of interest. Furthermore, certain aspects of the present invention provide a novel system and method for encoding the identification code of the IFF interrogator, while using an external laser module which does not necessarily provide means for modulating or encoding information on its laser beam, thereby enabling using such external laser as an IFF laser transmitter for the IFF interrogator.

Thus, according to a broad aspect of the present invention there is provided an Identification Friend or Foe (IFF) system including an IFF interrogator for interrogation of complementary IFF transponders. The IFF interrogator includes: an RF transceiver module, a control system, and a laser activation interface module operable in conjunction with an independent external laser transmitter; whereby:

(a) the RF transceiver module is configured and operable for transmitting an RF broadcast signal to be received by an IFF transponder of the complementary IFF transponders being within the interrogation range of the IFF interrogator system and for receiving an RF response signal transmitted by the IFF transponder;

(b) the laser activation interface module is configured and operable for interfacing with an external laser module to determine activation of the external laser transmitter of transmission of a laser beam;

(c) the control system is connectable to the RF transceiver module and to the laser activation interface module, and configured and operable for carrying out IFF interrogation by:
  i) arming the IFF transponders for sensing laser illumination by operating the RF transceiver module to transmit the RF broadcast signal;
  ii) utilizing the laser activation interface to determine activation of the external laser transmitter; and
  iii) processing information indicative of RF signals received by the RF transceiver to identify therein an RF response signal transmitted by the IFF transponder, which is complementary to the IFF interrogation system, in response to detection of the transmitted laser beam from the external laser transmitter by the IFF transponder.

According to another broad aspect of the present invention there is provided an Identification Friend or Foe (IFF) interrogator system for interrogating complementary IFF transponders which are complementary to the IFF interrogation system. The interrogator system includes: an RF transceiver module and a control system. The interrogator system also includes an activation interface module operable in conjunction with an independent external laser transmitter, whereby:
  (a) the RF transceiver module is configured and operable for transmitting an RF broadcast signal to be received by an IFF transponder and for receiving an RF response signal transmitted from the IFF transponder in response thereto;
  (b) the laser activation interface module is configured and operable for interfacing with the external laser transmitter to determine activation and provide a synchronizing signal indicative of a time of transmission of laser beam by the external laser transmitter; and
  (c) the control system is connectable to the RF transceiver module and to the laser activation interface and configured and operable for:
    i) registering time of transmission of at least one RF broadcast signal by the RF transceiver;
    ii) registering time of transmission of at least one laser beam transmitted by the external laser transmitter;
    iii) determining a time pattern associated with time intervals between the at least one RF broadcast signal and the at least one laser beam, beam the time pattern representing an identification code of the IFF interrogator system;
    iv) obtaining information from the RF transceiver indicative of RF signals received thereby;
    v) processing the information to identify if the RF signals include an RF response signal from a certain IFF transponder and decode the RF response signal to determine if it encodes the identification code of the IFF interrogator system which was represented by the time pattern of the at least one transmitted RF broadcast signal and at least one transmitted laser beam, and thereby determine if the certain IFF transponder was interrogated by the IFF interrogator system.

According to another broad aspect of the present invention there is provided an Identification Friend or Foe (IFF) transponder (e.g. complementary to the IFF interrogator). The IFF transponder includes:

(a) a photo detector configured and operable for detecting light illumination in a certain wavelength band when intensity of the illumination exceeds a certain threshold;

(b) an RF transceiver module configured and operable for receiving an RF broadcast signal transmitted by an IFF interrogation system complementary to the IFF transponder, and for transmitting an RF response signal to be received by the IFF interrogation system; and (c) a controller connectable to the RF transceiver module and to the photo detector, the controller being adapted to:
  i) process signals received by the RF transceiver to identify receipt of at least one RF broadcast signal from an IFF interrogation system;
  ii) process information obtained from the photo detector to identify detection of at least one interrogation laser beam by the photo detector;
  iii) determine a time pattern associated with the time interval between receipt time of the at least one RF broadcast signal and detection time of the at least one interrogation laser beam; and
  iv) operate the RF transceiver for transmitting the RF response signal such that the RF response signal encodes data indicative of the time pattern and wherein the time pattern representing an identification code of the interrogator to which the RF response signal is designated.

According to yet another broad aspect of the present invention there is provided an Identification Friend or Foe (IFF) interrogator system including:

(a) a laser activation interface module configured and operable for interfacing an external laser module to determine activation of a laser beam by the external laser module;

(b) an RF transceiver module configured and operable for receiving an RF response signal transmitted from an IFF transponder complementary to the IFF interrogation system, in response to interrogation of the IFF transponder by an interrogation laser beam;

In this aspect of the invention the external laser module may output a laser beam having a cross-section substantially smaller than a cross-sectional dimension of the area to be covered by the IFF interrogation system via illumination at a certain distance range from the external laser module, and intensity of the laser beam is substantially higher than the minimal intensity detection threshold of a transponder system complementary to the IFF interrogation system. To this end, the IFF interrogation system is associated with a beam scattering directive providing instructions for directing the optical output axis of the external laser module towards light scattering objects/surfaces in the vicinity of the distance range at which the cross sectional area should be covered, such that the cross-sectional area is illuminated by light scattered from the laser beam by the scattering objects/surfaces.

In some embodiments the beam scattering directive includes instructions for sweeping the orientation of the optical axis of the external laser transmitter across a certain angular span such that the area that should be covered by the IFF interrogation system is effectively illuminate by light scattered from the laser beam during the swiping.

In some embodiments the beam scattering directive is at least partially implemented by an operation manual of the IFF interrogation system which includes information indicative of the instructions.

In some embodiments the beam scattering directive is at least partially implemented by a beam direction module of the IFF interrogation system which is configured and operable to provide instructions for adjustment of an orientation of the optical output axis.

According to yet another broad aspect of the present invention there is provided an Identification Friend or Foe (IFF) interrogation method comprising carrying out IFF interrogation by carrying out the following:

(a) transmitting at least one RF broadcast signal suitable for receipt by a complementary IFF transponder;

(b) registering a time of transmission of the at least one RF broadcast signal by the RF transceiver;

(c) operating a laser activation interface module adapted to interface an external laser transmitter, to determine activation of the external laser transmitter for transmitting at least one interrogation laser beam towards an interrogation region of interest;

(d) determining and registering a time of transmission of the at least one interrogation laser beam by the external laser transmitter;

(e) determining a time pattern associated with time intervals between transmission times of the at least one RF broadcast signal and the at least one interrogation laser beam, the time pattern representing an identification code of the IFF interrogator system;

(f) obtaining information about RF signals received by an RF receiver;

(g) processing the information to determine whether the RF signals includes an RF response signal from an IFF transponder; and (h) upon detection of an RF response signal from a certain IFF transponder, decoding the RF response signal to determine whether it encodes the identification code of the IFF interrogator system which was represented by the time pattern, and thereby determine whether the certain IFF transponder was interrogated by the at least one interrogation laser beam.

In yet further aspect of the invention there is provided a Friend or Foe Identification (IFF) transponding method including:

(a) process signals received by the RF transceiver to identify receipt of at least one RF broadcast signal from an IFF interrogation system, and register time of the receipt (b) process signals obtained from the photo detector to identify detection of at least one interrogation laser beam by the photo detector, and register time of the detection;

(c) determine a time pattern associated with the time interval between the time of receipt of the at least one RF broadcast signal and the time of detection of the at least one interrogation laser beam; and transmitting an RF response signal encoding data indicative of the time pattern; the time pattern representing an identification code of the interrogation laser beam of an IFF interrogator to which the RF response signal is designated.

In another broad aspect the invention provides an Identification Friend or Foe (IFF) interrogation method for carrying out IFF interrogation. The method includes providing a beam scattering directive including instructions for directing the optical output axis of an external laser transmitter. The external laser transmitter outputs a laser beam with a cross-sectional area that is substantially smaller than a cross-sectional area to be illuminated at a certain distance range during the IFF interrogation, and intensity of the laser beam is substantially higher than the minimal intensity detection threshold of an IFF transponder system intended to respond to the IFF interrogation. Instructions for directing the optical output axis of the external laser transmitter include instructions to direct the optical output axis towards light scattering surfaces in the vicinity of the certain distance range such that the cross-sectional area is illuminated by light scattered from the laser beam by the scattering surfaces.

In some embodiments the beam scattering directive is at least partially implemented by an operation manual of the IFF interrogation system which includes information indicative of the instructions. Alternatively or additionally, in some embodiments the beam scattering directive is at least partially implemented by a beam direction module of the IFF interrogation system which is configured and operable to provide one or more of the instructions as operational instructions to directing module of the external laser system to adjust the orientation of the optical output axis.

According to some embodiments the instructions include at least one of the following:

i) instructions for detecting a scattering surface in the vicinity of the distance range;

ii) instructions for determining the orientation angle to direct the optical output axis towards the scattering surface;

iii) instructions for directing the optical output axis to the orientation angle(s) θ so as to direct it towards the scattering surface;

iv) instructions for activating, or determining activation of the external laser transmitter after the optical output axis is directed towards the scattering surface;

v) instructions for sweeping the orientation of the optical axis of the external laser transmitter across a certain angular span such that the area that should be covered by the IFF interrogation system is effectively illuminated by light scattered from the laser beam during the swiping.

Further details in the method ands systems of the present invention and their implementation are described in further detail with references to the accompanying drawings, in the detailed description section below.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 2A to 2C illustrate a block diagram and flow charts showing the configuration and methods of operation of an IFF system 1000 according to an embodiment of the present invention;

FIGS. 4A to 4C are block diagrams illustrating an IFF interrogator 100 according to an embodiment of the present invention comprising an activation interface 130 comprising a passive switch interface PSI coupled with an operating switch 320 of an external laser transmitter 300;

DETAILED DESCRIPTION OF EMBODIMENTS

Figure 1:
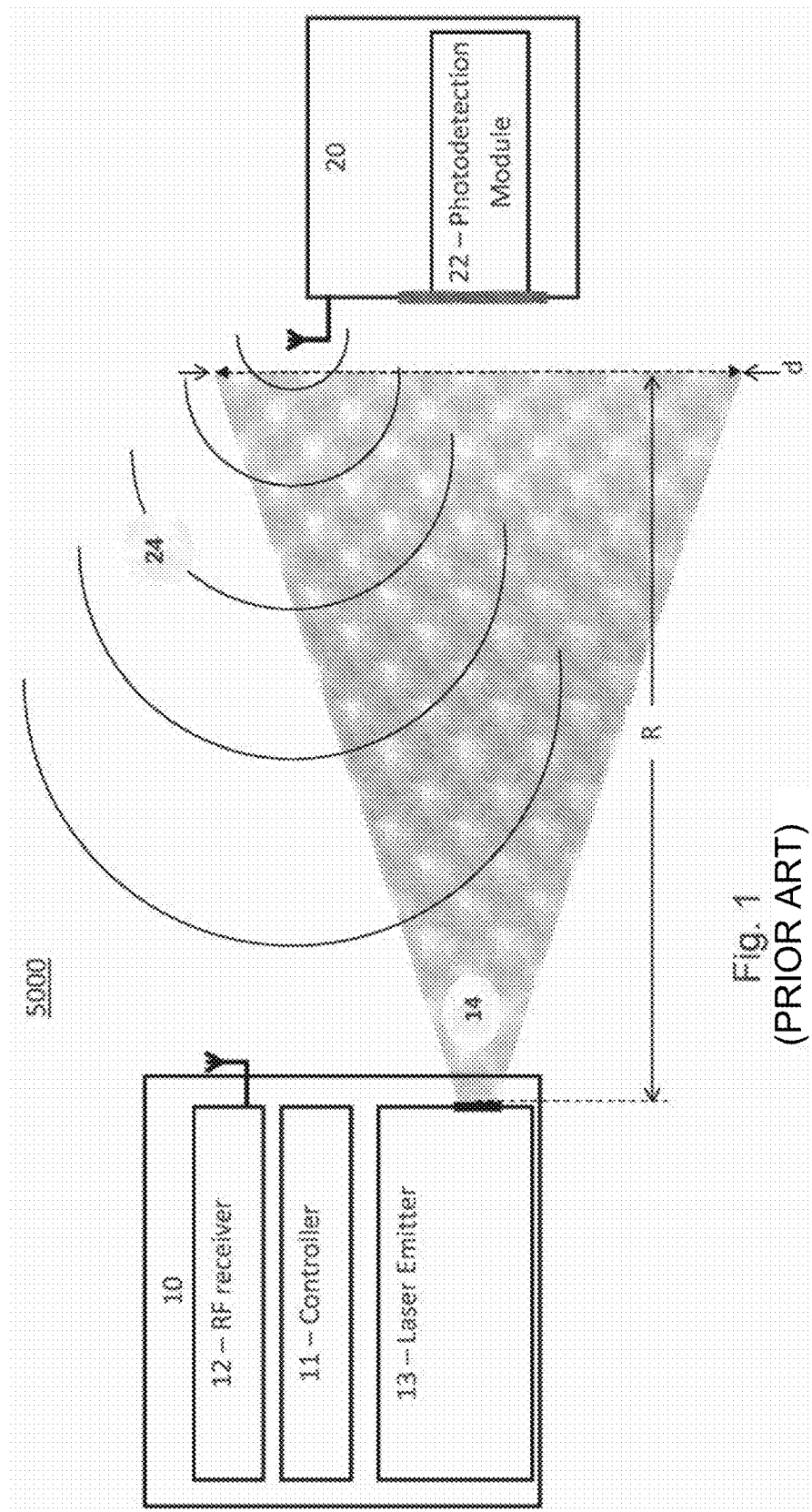
FIG. 1 is a block diagram of a conventional IFF system.

FIG. 1 is a block diagram depicting a conventional identification friend or foe system 5000 configured according to the general art. The system includes an IFF interrogator (interrogation system) 10 and an IFF transponder 20. The IFF interrogator 10 includes a controller 11 connected to RF receiver 12 and to laser emitter 13, which is integral to the interrogation system 10. The laser emitter 13 is configured to output a optical beam, which, has relatively wide cross-section d (e.g. typically d is in the order of a few meters to tens of meters), at the desired interrogation range R (e.g. typically R is a distance in the range between tens of meters to a few hundreds of meters or a few kilometers). Accordingly, the laser emitter 13 integral to such a conventional interrogation system 10 is suitable for covering/illuminating an interrogation region with a relatively wide cross-section d at the range R. The controller 11 is adapted to operate the laser emitter 13 such that the emitter 13, whose operation is controlled by the controller 11, encodes data indicative of the identification of the interrogation system 10 in the optical beam 14 it outputs. In turn, the IFF transponder 20 can detect the optical beam 14 of the interrogation (e.g. by photodetector 22), decode the identification code encoded in the detected laser beam 14, and reply by transmitting an acknowledgment RF signal 24 which encodes data indicative of the identification code that was found encoded in the optical beam 14. Finally, the interrogator 10 receiving the acknowledgment RF signal 24, decodes the identification code encoded therein and thereby determines (e.g. by comparing the identification code decoded from the acknowledgment RF signal 24 with the identification code it had previously encoded in the optical beam 14) whether the acknowledgment RF signal 24 was sent in response to the interrogation by laser beam 14 in which case it indicates the existence of friendly forces in the area interrogated by the interrogator 10 (e.g. covered by laser beam 14 illumination spot).

Thus, in order to achieve the task of IFF interrogation by optical/laser beam, conventional IFF systems, such as 5000, require having a specifically selected laser emitter 13 with the desired beam width to be integral with the interrogation system, such that it can be operated by controller 11 to provide/emit an encoded optical/laser beam having a desired/predetermined relatively wide width, encoding the identification code of the interrogation system 10.

Reference is made together to FIGS. 2A, 3, 4A, 5A, 6A and 7A, which are block diagrams schematically illustrating an Identification Friend or Foe (IFF) system 1000 including an interrogation system 100 (hereinafter also referred to as interrogator) and a complementary transponder system 200 (hereinafter also referred to as transponder). The interrogator 100 is configured and operable to interrogate a region of interest in search of complementary transponders (e.g. transponders of friendly forces) located in the region of interest. The transponders 200 are adapted for responding to interrogation by the interrogator (typically responding by transmitting suitable RF signals detectable by the interrogator, although other response methods are possible, such as an optical response signal).

According to the present invention, the interrogator system 100 includes a laser activation interface module 130 that is configured and operable for interfacing to an external laser transmitter/module 300 to determine activation of the external (e.g. independent) laser transmitter 300, for interrogating of the region of interest in conjunction with the interrogator system 100. It should be understood that the phrase determine activation and similar phrases, are used herein to refer to any of the following actions: (i) activating the external laser to generate and "fire" a laser beam, e.g. toward the region of interest (active mode of operation); and (ii) determining/sensing if the laser was fired (passive mode of operation).

The interrogator system 100 also includes a radio-frequency (RF) transceiver module 120 (i.e. being implemented as separated or combined RF receiver and transmitter module(s)). The RF transceiver 120 is configured and operable for transmitting an RF broadcast signal to be received by an IFF transponder of the complementary IFF transponders being within the interrogation range (region) of the IFF interrogator system and for receiving an RF response signal transmitted by an IFF transponder in response to detection/receipt of both the RF broadcast signal and the laser beam transmitted by the IFF transponder.

To this end, the interrogator system 100 further includes a control system 110 that is connectable to the laser activation interface module 130 and to the RF transceiver module 120. The control system 110 may be, for example, implemented, or include a computerized system including processing unit PU (e.g. CPU/GPU) and memory for storing computer readable instructions (e.g. firmware or software) for implementing interrogation of a region of interest by carrying out the operations of method 500 illustrated in the flow chart of FIG. 2B. Alternatively or additionally, the control system 110 may be implemented by hardware such as analog or digital circuitry adapted to carry out one or more of the operations of method 500.

Figure 2B:
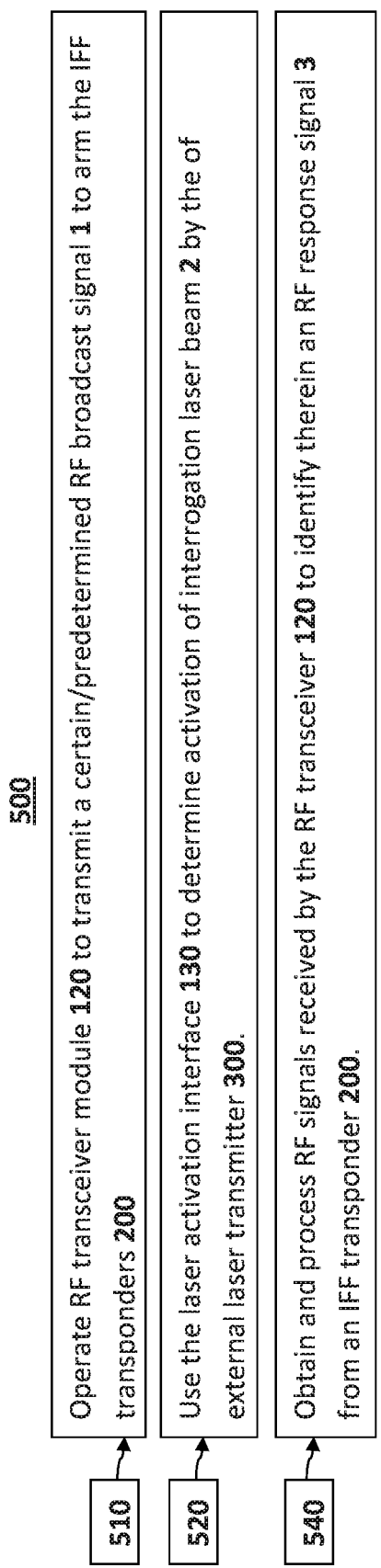

More specifically, turning now to FIG. 2B, method 500, which is carried out by the control system 110 for interrogating IFF transponders, includes the following operations:

510—operating the RF transceiver module 120 to transmit a certain/predetermined RF broadcast signal 1 that arms (e.g. initializes) complementary IFF transponders 200 (complementary to the interrogator 100) who receive the RF broadcast signal 1. In this regard, it should be noted that the term arming is used herein to indicate that upon receipt of the RF broadcast signal 1, the receiving IFF transponders 200 are activated and are ready for sensing laser illumination incident on their photodetection module 230, if such illumination happens to be directed thereto. Such may advantageously entail the transition of the optical detection modules from a low-power standby mode to the active mode; as IFF interrogations are few and on average occur at large time intervals this allows the transceivers to be mostly in the low-power standby mode, saving on their battery power.

520—utilizing the laser activation interface 130 to determine activation of the external laser transmitter for transmitting the interrogation laser beam to the region of interest. As indicated above, laser activation interface 130 may include an active interface adapted for receiving operational instructions for activating the external laser transmitter 130 from the control system 110, and upon receipt of the operational instructions, operating the external laser transmitter 300 to transmit a laser beam (e.g. towards the region of interest) to interrogate the region of interest. In this case, in 520 the control system 110 provides operational instructions to the laser activation interface 130 to operate the external laser transmitter. Alternatively or additionally, the laser activation interface 130 may include a passive interface configured and operable for sensing/detecting the activation of the external laser 300, and upon detecting that the external laser transmitter was activated, providing a signal/data notification indicative of the activation to the control system 110. Examples of laser activation interfaces 130 configured and operable as passive interfaces are described for example in the following in relation to FIGS. 4A to 6B. Thus, the interrogator system may include any one or more of the active or passive activation interfaces. Accordingly, in 520 the control system 110 may either passively determine (receive indication (signal/data) that the external laser was fired, or actively trigger the laser to fire when needed (e.g. by providing suitable operational instructions).

540—Obtain and process information (e.g. data/signal) indicative of RF signals received by the RF transceiver 120 to identify/determine if the received RF signals include an RF response signal 3 (also referred to in the following as acknowledging (ACK) signal) that was transmitted by an IFF transponder 200, in response to detection of the transmitted optical/laser beam 2 from by the IFF transponder 200.

The IFF transponder 200 includes an RF transceiver 220 (i.e. an RF transmitter and an RF receiver module or a module capable of both receiving and transmitting RF signals), a photodetection module 230 (e.g. including a photodetector, and/or any other suitable light sensor) capable of detecting an illumination/optical beam that is transmitted from the external laser transmitter 300 and incident thereon, and a controller 210 connectable to the RF transceiver 220 and the photodetection module 230. The controller 210 may be, for example, a computerized system including processing unit PU (e.g. CPU/GPU) and memory for storing computer readable instructions (e.g. firmware or software) for responding to interrogation by the interrogator 100, by carrying out the operations of method 600 illustrated in the flow chart of FIG. 2C. Alternatively or additionally, the controller may be implemented by hardware such as analog or digital circuitry adapted to carry out one or more of the operations of method 600.

Figure 2C:
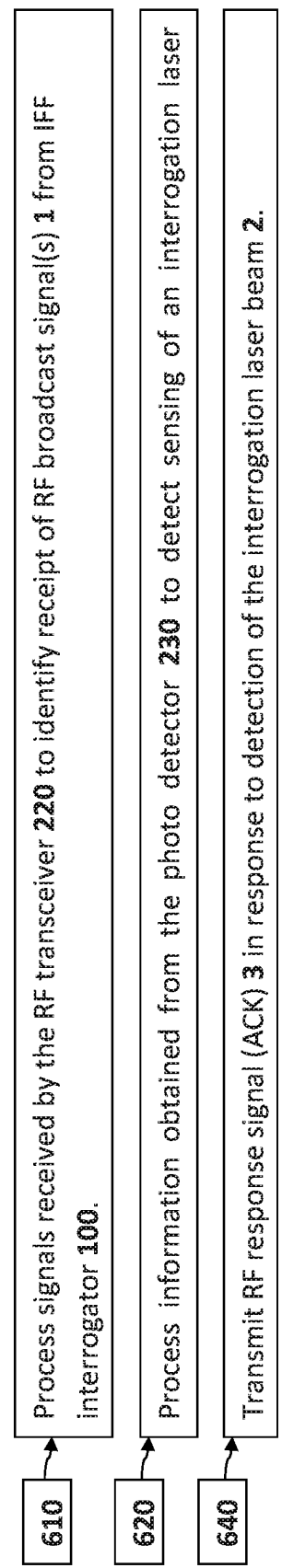

More specifically, turning now to FIG. 2C, method 600, which is carried out by the controller 210 includes the following operations:

610—obtain data indicative of RF signals received by the RF transceiver module 220. When the IFF transponder is in standby mode, the RF transceiver module 220 may be continuously operating to receive RF signals and provide data/signals indicative thereof to the controller 210. In turn, the controller 210, processes the data/signals about the received RF signals, to determine if an RF broadcast signal 1 from an IFF interrogator 100 was received by the RF transceiver 220. In this regard, determining whether RF signals received by the RF transceiver module 220 include such an RF broadcast signal from the interrogator, may be based on the wavelengths of the RF broadcast signal and/or the modulation of the RF broadcast signal and/or on data encoded in the RF broadcast signal, such that upon detection of an RF signal with wavelength/modulation/data matching predetermined criteria (e.g. stored in memory of the controller 210) then the RF signal is identified as an RF broadcast signal 1 from the interrogator 100. Such criteria may include use of periodically updated security code, and/or of proper encryption of the RF transmission, to ensure that third parties are incapable of interfering with, imitating or intercepting such RF broadcast signals. Upon detection of such a legitimate RF broadcast signal, the controller 210 sets the IFF transponder in active optical detection mode, in which its photodetector is operated for sensing and/or detection of interrogating laser beam 2 from the IFF interrogator 100.

620—the controller 210 obtains and processes information (data/signals) obtained from the photodetector 230, to determine whether an interrogation optical/laser beam from an IFF interrogator 100 was sensed/detected by the photodetection module 230 of the IFF transponder 200. For instance, the controller 210 may process the information (data/signals) from the photodetector 230, and upon determining that light exceeding certain illumination intensity and/or light with a certain time pattern (e.g. in cases where the external laser 300 emitters are pulsed or modulated laser beams) is sensed by the photodetector module 230, the controller determines that an interrogation light beam 2 from an IFF interrogator 100 was detected.

640—Upon detection of the interrogation optical beam 2, the controller 210 operates the RF transceiver 220 to transmit an RF response signal 3 to be received by the IFF interrogator 100. The RF response signal 3 may be for example an encoded signal, and may, for example, encode data indicative of the identity of the IFF transponder 200.

As indicated above, preferably once obtaining an RF response signal 3 from an IFF transponder, the interrogator 100 should verify that the received RF response signal 3 was transmitted from the IFF transponder 200 in response to the interrogation laser beam 2 that was sent by the interrogator 100 and not in response to detection of a stray laser beam of or a laser beam from a different interrogator. Otherwise, in cases where several IFF interrogators are used in the same area, this might result in many false alarms erroneously indicating that friendly forces are in the region of interest that is interrogated by the IFF interrogator 100 (because should the IFF transponder 200 not identify the identity (code) of the IFF interrogator it to which to respond and not encode that in its RF response signal, then all the interrogators receiving the RF response signal would consider it to be sent in response to their interrogation—which will raise many false alarms).

To avoid such a scenario, certain conventional techniques operate the laser to encode the interrogation laser beam with a code identifying the identity of the IFF interrogator which sourced/transmitted the beam. The IFF transponder which detects the interrogation laser beam, decodes the code/identity of the interrogator and encodes it in its RF response signal, so that the IFF interrogators receiving the RF response signal will identify in response to which interrogation laser beam it was sent.

However, in the present case, when external laser transmitter 300 is used to transmit the interrogation laser beam 2, it is mostly not possible, or is impractical, to encode information onto the optical/laser beam transmitted. Therefore, according to certain aspects of the present invention, the code/identity of the IFF interrogator 100 is assigned and communicated in association with the interrogation laser beam 2 alleviating the need to encode the interrogation optical/laser beam 2 itself (i.e. without encoding the interrogation optical/laser beam 2).

Figure 3:
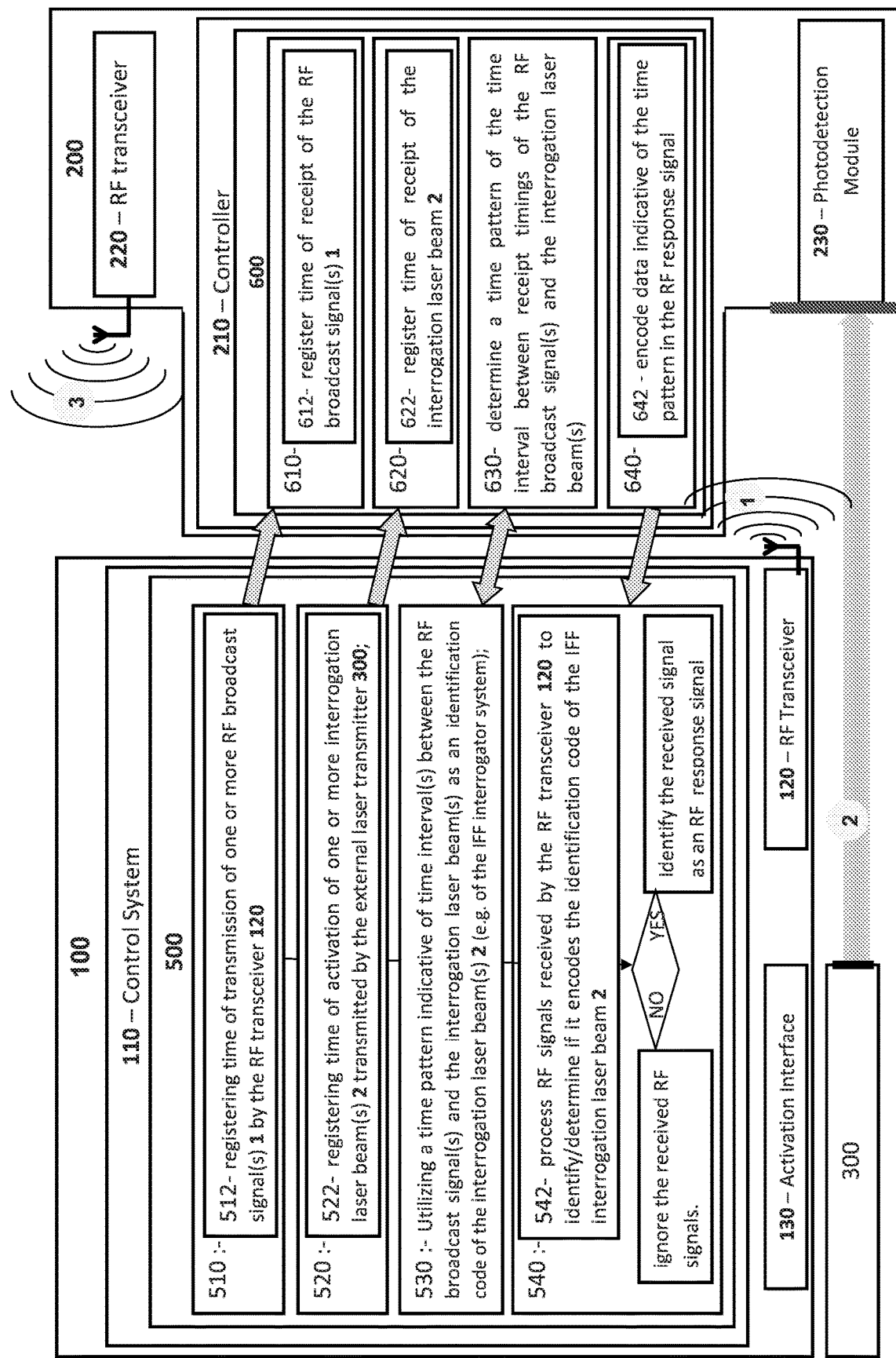
FIG. 3 is a block diagram illustrating an IFF interrogator 100 and a complementary IFF transponder 200, according to an embodiment of the present invention which are configured for respectively communicating a code/identity of the IFF interrogator 100 in association with the interrogation optical beam 2, and determining and encoding that code in the RF response signal 3.

FIG. 3 is a block diagram exemplifying the configurations and methods of operation of an IFF interrogator 100 and of a complementary IFF transponder 200, which are configured for respectively communicating a code/identity of the IFF interrogator 100 in association with the interrogation laser beam 2, and determining and encoding that code in the RF response signal 3, so that an IFF interrogator receiving the RF response signal can determine whether it was sent in response to its interrogation. The IFF interrogator 100 and the IFF transponder 200 of FIG. 3 are configured and operable similarly to the IFF interrogator 100 and the IFF transponder 200 of FIG. 2A, except that here, in addition, the IFF interrogator 100 assigns/associates a code/identity with the interrogation laser beam 2 (e.g. the code is associated with a time delay, or, more generally, a time pattern of time intervals, between the broadcast RF signal(s) 1, and the interrogation optical/laser beam(s) 2). Accordingly, in this implementation, the IFF transponder 200 identifies this code/identity (by recognizing the time delay, or the pattern of time intervals, between the receptions of the broadcast RF signal(s) 1, the interrogation laser beam(s) 2), and encodes this code/identity in the response RF signal it transmits.

To this end, the control system 110 of the IFF interrogator is adapted to carry out the operations of method 500 while carrying out additional operations (or sub-operations) as described below, in order to assign the interrogation laser beam 2 with an identifying code. The controller 210 of the IFF transponder 200 carries out the operations of method 600 described above while also carrying out additional operations (and/or sub operations) in order to determine the identifying code assigned to the interrogation laser beam and encode and transmit it together with the RF response signal.

To this end, in 510 the control system 110 transmits certain/predetermined one or more RF broadcast signal(s) 1 to arm the IFF transponders 200, and in sub-operation 512 it registers (e.g. stores in memory) the time of transmission of one or more RF broadcast signal(s) 1. In turn, in 610 the controller 210 processes signals received by the RF transceiver 220 and identifies receipt of RF broadcast signal(s) 1, and in sub-operation 612 it registers (e.g. stores in memory) the time of receipt of the RF broadcast signal(s) 1.

Accordingly in 520 the control system 110 utilizes the activation interface 230 to determine activation (e.g. activate transmission or, or determine occurrence of transmission) of an interrogation laser beam 2 by the external laser module 300. In addition, in sub operation 522 the control system 110 registers the time of transmission of the interrogation laser beam 2. In turn, in 620, the controller 210 process information from the photo detector 230 to determine if the interrogation laser beam(s) 2 was sensed/detected thereby, and registers a time of sensing of the interrogation laser beam 2.

In this regard, as noted in 530, the control system utilizes a time delay or a time pattern of time interval(s) between the at least one RF broadcast signal(s) 1 and the interrogation laser beam(s) (typically one laser beam is used for interrogation) as an identification code identifying the interrogation laser beam 2. More specifically, in some cases, the time pattern is actually a time delay between the RF broadcast signal 1 and the interrogation laser beam 2 (i.e. the time delay between the time registered at 512 and that registered at 522). Alternatively, more than one RF broadcast signal 1 and/or more than one interrogation laser beam may be used, and in that case the time pattern may be actually indicative of the sequence to time delays between them. In any case, in 630, controller 210 determines the time pattern of the time interval between receipt timings of the RF broadcast signal (s) 1 and the interrogation laser beam(s) 2. Since both the RF signals and the laser beams propagate at substantially similar speeds, then the time pattern/delay determined at 630 is equivalent/substantially matching/equal to the time pattern/delay which is used in 530 to identify the interrogation laser beam(s) 2 by the control system 110.

It should be noted that in some embodiments the control system 110 is configured and operable for controlling the transmission time of the RF broadcast signal 1 and/or the transmission time of the interrogation laser beam 2 so as to adjust the time delay between them (or more generally adjust a time pattern of time intervals between several transmissions of one or more RF broadcast signal(s) 1 and one or more interrogation laser beam(s) 2). The time delay/pattern represents an identification code of the IFF interrogation system 100. To this end, in some embodiments the time pattern/delay is a predetermined time pattern/delay (e.g. which may be stored in a memory module of the control system 110) representing a predetermined identification code of the IFF interrogation system 100. Alternatively, the time pattern/delay may be a random/arbitrary time pattern/delay presenting a random/arbitrary name/identification code assigned to the transmission of the interrogation laser beam 2, based on the time interval that happened to be between it and the RF broadcast signal 1. In this case, the control system 210 may assign such random/arbitrary name/identification code (based on the time delay) to each interrogation cycle (e.g. to each interrogation laser beam 2), and store the assigned code in memory.

In 640 the controller 210 transmits an RF response signal 3 while in 642 it encodes the data indicative of the time pattern in the transmitted RF response signal 3 (by any suitable encoding technology). In turn, in 540 the control system 110 obtains and processes the RF signals received by the RF transceiver 120, and identifies the RF response signal 3 therein and decodes the time pattern encoded therein. Then in 542, the control system 110 determines whether the RF response signal 3 encodes the identification code of the interrogation laser beam 2. More specifically, the control system 110 compares the time pattern decoded in the RF response signal 3 with the time pattern assigned to the interrogation laser beam 2 in 530. If these time patterns are matching/equivalent (e.g. in case the time delay between the RF broadcast signal 1 and the interrogation laser beam 2 which is registered in 530, is about equal to the time delay decoded in the RF response signal 3), then in 534 the control system 110 identifies the received RF response signal, as one transmitted in response to interrogation by the interrogation laser beam 2. Otherwise, if these time patterns/delays do not match, then it is understood that the RF response signal 3 received by the IFF interrogator 100 may have arrived from another source, or was issued in response to interrogation by another IFF interrogator, and therefore, in this case, it is ignored by the control system 110.

Turning back to FIG. 2A, the activation interface 130 of the interrogation system 100 may optionally include passive and/or active interfaces, 132 and/or 134, that are adapted for passive determination of the laser fire and/or for active triggering its fire, of the external laser transmitter 300. In various embodiments of the present invention the activation interface 130 is implemented (configured and operable for) for interfacing different modules of the external laser transmitter 300.

For instance, in some cases the external laser transmitter 300 is expected to optionally include a controller 330 having input tIN and/or output sOUT timing ports 335 (e.g. "trigger IN" and/or "synchronizing OUT" ports) for respectively receiving trigger signals for triggering laser emission by the laser transmitter 300, and/or outputting a synchronizing signal when laser beam is emitted by the laser transmitter 300. In such cases, the activation interface 130 of the interrogation system may be implemented with suitable electronic circuitry and/or a computerized module (optionally implemented as part of the control system 110) that is adapted for actively triggering fire of the external laser 300 by issuing a proper trigger in signal to the trigger input port tIN of port(s) 335 of the external laser 300, and/or possibly determining the fire of the external laser 300 by detecting a synchronizing out signal coming from the synchronizing output port sOUT of ports 335. In this way, active 304 and/or passive 302 interfaces with the external laser 300 may be implemented (wherein trigger in port tIN in the external laser 300 allows implementation of active interface 304 and a synchronizing out port sOUT in the external laser 300 allows implementation of the passive interface 302).

It should be understood that the triggering and synchronizing ports are electronic/communication ports which can be implemented and accessed according to any suitable technique known in the art for example by wired/wireless communication ports adapted to receive/output triggering/synchronizing signals and/or vial electronic I/O ports.

To this end, in some embodiments the laser activation interface 130 includes, or is implemented as, a computerized controller module including at least one of software and/or hardware modules, that are configured and operable for implementing a programming interface for interfacing with a second computerized controller 330 of the external laser transmitter 300, (e.g. the second computerized controller 330 may include ports 335 such as the triggering and/or synchronizing ports tIn and/or sOut). The computerized controller module of the laser activation interface 130 may be operable in passive mode for receiving data indicative of the activation state of the external laser transmitter 300 from the second computerized controller 330 and communicating this data to the control system 110. Alternatively or additionally, computerized controller of the laser activation interface 130 is operable in active mode for receiving from the control system 110 operational instructions for activation of the external laser transmitter 300 and communicating corresponding instructions to the second computerized controller 330 to activate the external laser transmitter accordingly.

Alternatively or additionally, in certain embodiments of the present invention the activation interface 130 is configured and operable for interfacing a switch module 320 of the external laser transmitter 300, which is operable for triggering fire of the external laser transmitter 300. The activation interface 130 may include in this case a switch interface assembly SI configured for coupling with the activation switch 320 of the external laser module 300.

In this case, the activation interface 130 may implement an active interface 304, and the switch interface assembly SI may include an active switch interface ASI implemented for example with an electro-mechanical module (e.g. Piezoelectric module) that is mechanically coupleable to the activation switch 320 of the external laser 300 and adapted to receive operational instructions/signals from the control system 110 of the interrogator system 110 and mechanically operate/toggle the activation switch 320 of the external laser transmitter 300 (which may be a mechanical switch), accordingly.

Alternatively or additionally, in some cases the activation interface 130 may implement a passive interface 132, and the switch interface assembly SI may include a passive switch interface PSI implemented for example with a mechanical interface MI that is mechanically connected/coupled to the activation switch/button 320 of the external laser 300, and adapted to detect activation of the external laser transmitter 300 when the activation button/switch 320 is operated, and provide indication (e.g. signal indication) of such activation to the control system 110 of the interrogation system 100.

For instance, FIGS. 4A to 4C depict a passive switch interface PSI being a member of the activation interface 130 of the interrogation system coupled with the switch 320 of the external laser transmitter 300. FIG. 4A shows the interrogation system 100 including a computerized/digital control system 110 possibly including a memory MEM and a user interface UI (e.g. a display module) and/or input/output ports IO configured and operable to provide data indicative of the interrogation results to a user. The control system 110 is connectable to an RF transceiver 120 capable of receiving the ACK signal 3 from the IFF transponder 200. Here, the RF transceiver 120 includes an antenna ANT possibly connected to an analog to digital (A/D) converter and/or amplifier (any one or both are represented by AD in the figure). Also the control system 110 is connectable to activation interface 130, which is in this case a passive interface adapted for providing the control system with a signal (electric or wireless signal) upon activation of the external laser 300. In this example the activation interface 130 includes a passive switch interface PSI that is coupled to an activation button 320 of the external laser transmitter 300. The activation interface 130 may include an amplifier A for amplifying the activation signal and possibly also digital to analog (D/A) and/or A/D in cases where such are needed. FIGS. 4B and 4C show passive switch interface PSI in un-pressed and pressed states respectively. In the pressed state the passive switch interface PSI is pushed/depressed by a user/operator against the activation button/switch 320 of the external laser 300, to press/toggle it. At the same time, when pressed, passive switch interface PSI also provides/causes provision of a signal indicating that the activation button/switch 320 is pressed to the control system 110. To this end, in this example the activation button 320 of the external laser module is mechanical and the passive switch interface PSI is a mechanical interface that includes a mechanical mechanism 135 that transfers a depression action by a user onto the mechanical activation button 320, and a switch/button 133 that operates an electric circuit 137 providing the control system 110 with an indication/signal that the activation button 320 was pressed.

Figure 5B:
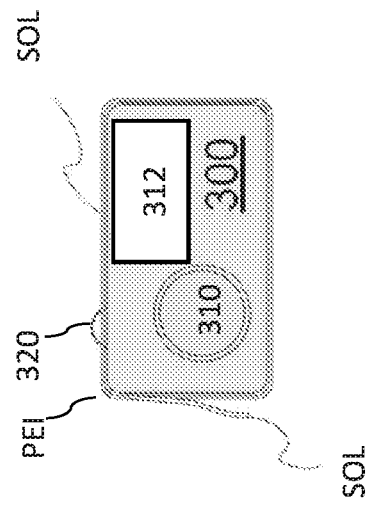
FIGS. 5A and 5B are block diagrams illustrating in a self explanatory manner an IFF interrogator 100 with an activation interface 130 comprising a passive electromagnetic interface PEI electromagnetically coupled to sense activation of an external laser transmitter 300.
Figure 5A:
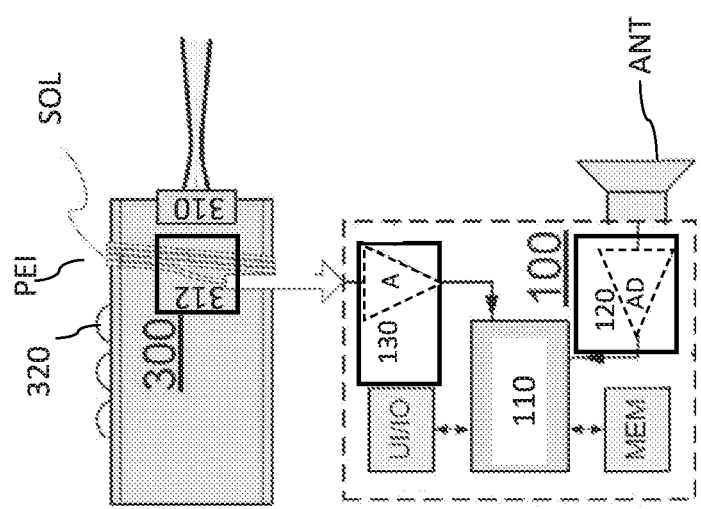
Figure 6B:
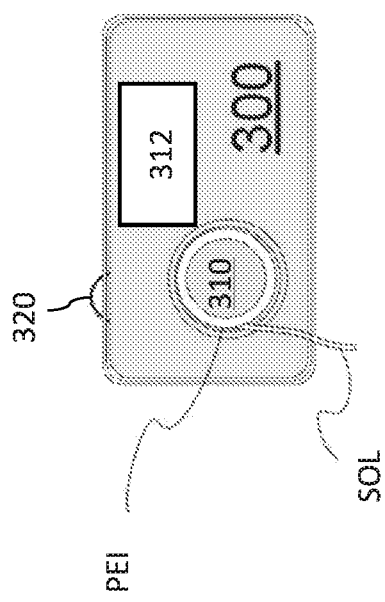
FIGS. 6A to 6B are block diagrams illustrating in a self explanatory manner of an IFF interrogator 100 according to another embodiment of the present invention, in which the passive electromagnetic interface PEI is electromagnetically coupled to the laser emitter 310 the an external laser transmitter 300.
Figure 6A:
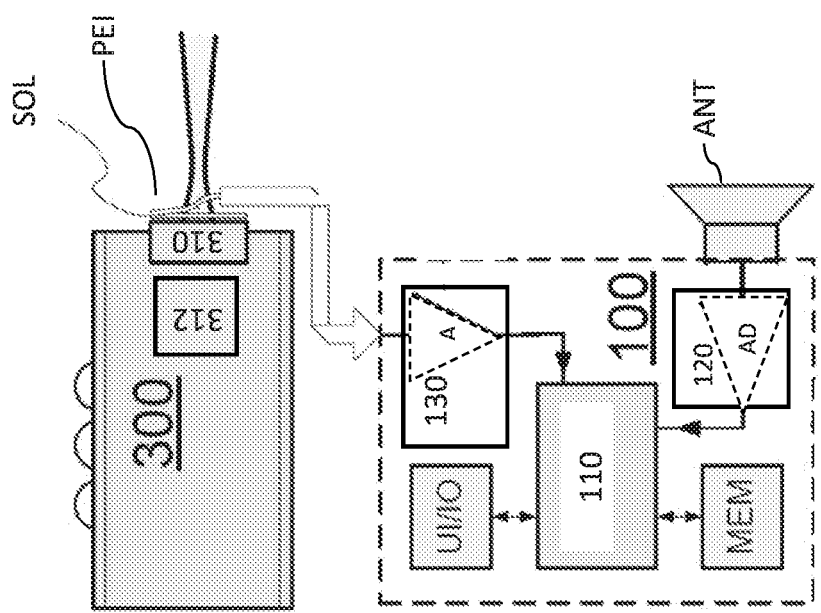

Alternatively or additionally, in certain embodiments of the present invention the activation interface 130 is configured and operable for detecting when the external laser transmitter 300 is activated by sensing electromagnetic interference that is associated with the external laser fire and/or with the high electric currents it requires/uses on fire. For instance, FIGS. 5A and 5B and FIGS. 6A and 6B depict two embodiments of an interrogation system 100 which include a passive electromagnetic interface PEI, being a member of the activation interface 130 of the interrogation system 100. FIGS. 5A and 6A show an interrogation system 100 according to two embodiments of the present invention with modules configured similarly to those described above with reference to FIG. 4A. Here the control system 110 is connectable to activation interface 130, which is in this case a passive interface adapted for providing the control system with a signal (electric or wireless signal) upon fire of the external laser 300. In this example the activation interface 130 includes a passive electromagnetic interface PEI including electromagnetic detection means which are implemented in this example by inductance detection circuitry SOL (e.g. solenoid/coil) located/wrapped in the vicinity of the laser emitter 310 (e.g. the laser emitter/diode) of the external laser transmitter 300 or in the vicinity of the electric wires/power-supply 312 that are connected to the laser 310. This laser 310 is a laser emitter such as a diode laser, a solid state laser, a fiber laser or in other forms. FIGS. 5A and 6A also depict illustratively a side view of the external laser transmitter 300 coupled with the passive electromagnetic interface PEI according to two embodiments of the present invention. FIGS. 5B and 6B depict illustratively a front view of the external laser transmitter 300 coupled with the passive electromagnetic interface PEI according to these two embodiments respectively. The electromagnetic detection means SOL of the passive electromagnetic interface PEI are adapted to sense the electromagnetic interference caused by the electronic power supply 312 and/or by the laser 310 upon fire of laser beam 2 from the external laser transmitter 300. It is noted that in FIGS. 5A and 5B the electromagnetic detection means SOL are shown to include a coil wrapped around the power supply 312 of the external laser transmitter 300 and in FIGS. 6A and 6B the electromagnetic detection means SOL includes a coil wrapped around the laser 310. In any case when electric current is supplied by the power-supply 312 to the laser 310, the electromagnetic detection means SOL sense the electromagnetic interference caused by this current and generate in response electric signal/indication that the external laser transmitter is activated to emit a laser beam 3. The control system 110 receives such an indication and operates as described in method 500 above.

It should be noted that in some embodiments of the present invention the passive electromagnetic interface PEI and/or electromagnetic detection means may include a light detector (e.g. photodetector, not specifically shown), which can be located in an optical path of at least a portion of the laser output light 2 output and/or scattered from an optical output port of the external laser transmitter 300. In such embodiments the light detector senses the emitted light 2 and thereby determines/outputs a signal (e.g. photocurrent) to the control system 110 which indicates the activation state of the laser 310. To this end, the light detector may be used instead of, or in addition to, the inductance detection circuitry SOL described in the embodiments of FIGS. 5A through 6B above.

Figure 7A:
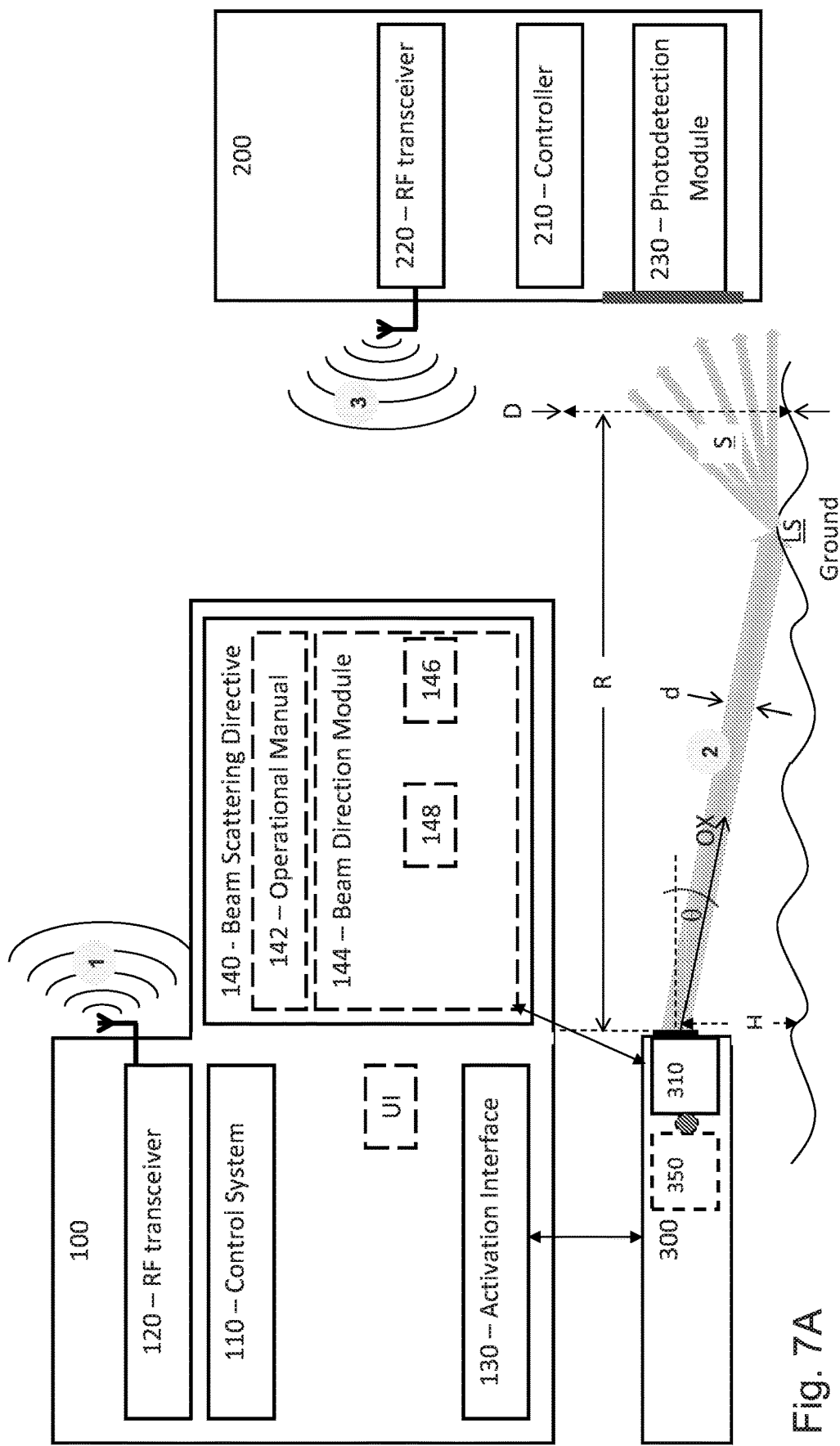
FIGS. 7A and 7B are a block diagram and a flow chart showing the configuration and method of operation of an interrogation system 100 adapted to be coupled to an external laser transmitter 300 outputting a narrow laser beam 2.
Figure 7B:
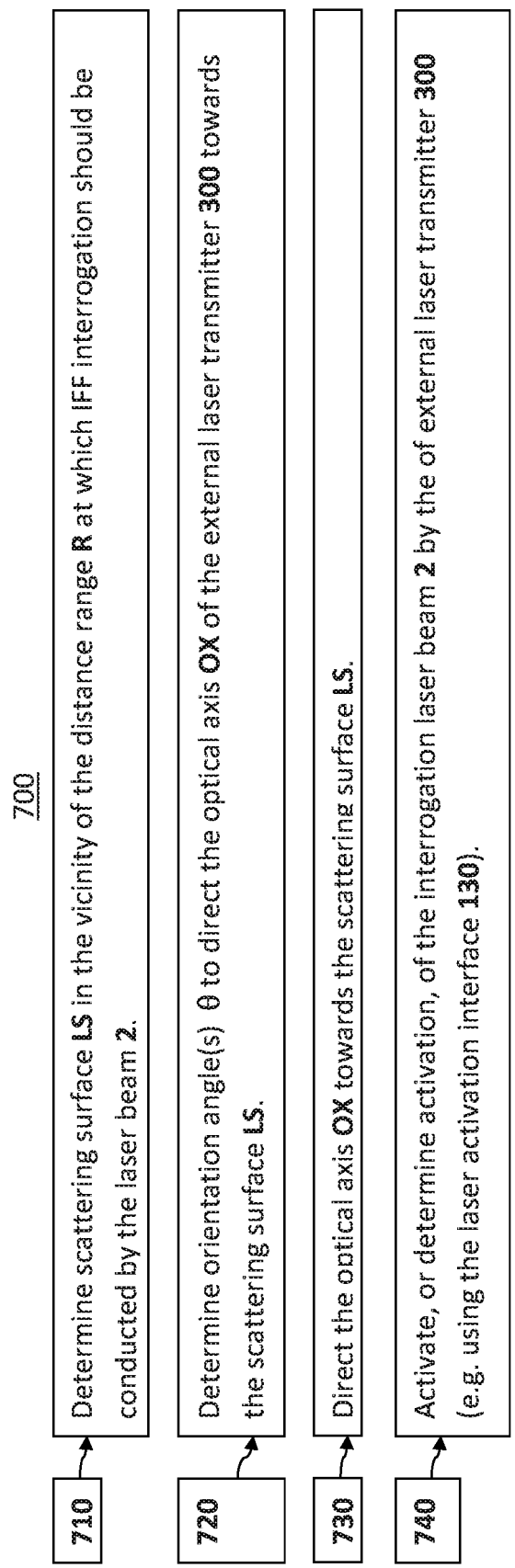

Reference is made now together to FIGS. 7A and 7B. FIG. 7A is a block diagram of an interrogation system 100 adapted to be coupled to an external laser transmitter 300 that provides/emits an optical/laser beam 2 having cross-section dimension d that is substantially smaller than the desired cross-sectional dimension D of the area that should be covered by the IFF interrogation system 100 by illumination of the laser beam 2 at a certain distance (range) R from the external laser transmitter 300. FIG. 7B is a flow chart showing method 700 for operation of the interrogation system 100 to cause scattering of the laser beam 2 with the small cross-section d such that the scattered light S illuminates a much larger desired cross-sectional dimension D and thereby enables interrogation of IFF transponders 200 located within the cross-sectional area D at that distance range R. The modules of the IFF interrogation system 100 and the IFF transponder 200 that are shown in FIG. 7A may be configured similarly to similar modules described above with reference to FIGS. 2A, 3, 4A, 5A and 6A.

It should be noted that in order to allow utilization of the scattered light from the narrow cross-section beam 2 for interrogating the cross-sectional area D, the external laser transmitter 300 should be adapted to provide the narrow laser beam 2 with intensity I of that which is substantially higher than the minimal detection threshold intensity $I_m$ of the transponder system 200 (of its photodetection module 230). More specifically, the external laser transmitter 300 should be adapted to provide a laser beam with intensity I (at the distance range R) that is in the order of $I \geq I_m \times (d/D)^2$ or higher. To this end, in certain embodiments of the present invention, the interrogation system 100 is adapted to utilize external laser systems 300 such as range finders, which provide high intensity, pulsed, narrow laser beams 2. Such high intensity pulsed narrow laser beams are indeed suitable for range finders since they need to be able to detect and measure the time of flight of light which is scattered from the laser beam 2 and returns from the distance range that needs to be measured. However, for conventional IFF interrogation systems, such narrow pulsed laser beams of the range finder are less suitable, since they do not cover the entire cross-section D that needs to be interrogated.

The present invention solves this problem and allows utilizing narrow (possibly pulsed) high intensity external laser transmitters 300 for IFF interrogation. According to an embodiment of the present invention the IFF interrogation system 100 includes, or is associated with, a beam scattering directive 140 providing instructions for directing the optical output axis OX of the external laser module towards light scattering objects/surfaces LS (e.g. ground surface) in the vicinity of the distance range R, at which the cross sectional dimension D should be covered. Accordingly, the cross-sectional dimension D is illuminated by scattered light S from the laser beam 2 that is scattered from scattering objects/surfaces LS.

FIG. 7B is a flow chart 700 of the method/instructions provided by the beam scattering directive 140. 710 provides instructions for determining/detecting a scattering surface LS in the vicinity of the distance range R at which IFF interrogation should be conducted by the laser beam 2. In some embodiments the scattering surface LS may be detected/selected manually by an operator of the interrogation system 100, while in some embodiments the beam scattering directive 140 includes a detector 146 (e.g. optical detector such as an imager) and is adapted to process data/imagery from the detector to detect/identify scattering surfaces near the distance range R and determine their location. Alternatively or additionally, a primary scattering surface LS that is considered, is the ground near the distance range R. In this case, 710 provides instructions to obtain data indicative of the magnitude and direction of the distance range R and the height H of the external laser transmitter 300 above the ground. 720 provides instructions to determine the orientation angles θ (e.g. azimuth and/or elevation) to direct the optical axis OX of the external laser transmitter 300 towards the scattering surface LS. In case the scattering surface LS is the ground, as indicated above, then the elevation angle to direct the optical axis OX is $\theta_e = \text{Tan}^{-1}(H/|R|)$. In case of other scattering surfaces LS (not ground), the orientation angles θ may be determined by any technique known in the art (e.g. triangulation) based on the relative displacement between the external laser transmitter 300 and the location of the scattering surface LS. Determining the orientation angles θ may be performed manually by an operator of the system, or the beam scattering directive 140 may include direction processor 148 (e.g. computerized system) that obtains data indicative of the location of the scattering surface LS relative to the external laser transmitter 300 and determines the orientation angle(s) θ accordingly, for instance in the manner described above. 730 provides instructions to direct the optical axis OX to the orientation angle(s) θ so as to direct it towards the scattering surface LS. Directing the optical axis OX may be performed manually, by an operator of the system directing the external laser transmitter 300. Alternatively or additionally, in some cases the external laser transmitter 300 includes directing system 350 (e.g. motorized gimbal), and the direction processor 148 is adapted to provide/issue instructions to direct the optical axis OX, to the directing system 350, such that directing of the laser beam 2 is performed automatically. 740 provides instructions to determine activation (i.e. trigger fire, or determine fire) of the interrogation laser beam 2 by the of external laser transmitter 300 (e.g. using the laser activation interface 130). This may be performed as described above for example with reference to operation 520 of method 500.

As indicated above, one or more of the operations/instructions of method 700 which are provided by the beam scattering directive 140 may be carried out manually by an operator of the system. To this end, beam scattering directive 140 may include operational manual including information/instructions for the operator to carry out certain of the operations of method 700.

Alternatively or additionally, in some embodiments one or more of the operations/instructions of method 700 are carried out automatically by the beam scattering directive 140. To this end, the beam scattering directive 140 may include a beam direction module 144 which may be a computerized and/or analogue system implementing certain of the operations of method 700 to adjustment of an orientation θ of the optical output axis OX. For instance, the beam direction module 144 may include a direction processor 148 that is configured and operable for computing an orientation angle(s) θ to set/direct the optical output axis OX towards the scattering objects/surfaces LS and output data indicative of the instructions for adjusting of the orientation of the optical output axis accordingly.

In some cases a scattering surface considered is the ground surface within several meters near the distance range R. The beam scattering directive provides instructions for orienting elevation of the optical output axis OX of the external laser module downwards such that it intersects this ground surface. The direction processor 148 may be configured and operable to utilize data indicative of the certain distance range R from the external laser module 300 and height position H of the external laser module 300 and process/computes an elevation angle θ of the orientation to direct of the optical output axis to intersect the ground at about the distance range such that the ground scatters the laser beam.

In cases where the scattered cross-sectional dimension is insufficient to generate a large enough illumination to cover the region of interest for IFF interrogation, the orientation of the external laser transmitter may be swept across a small angle in one or two attitudes and the laser fired repeatedly to effectively illuminate the entire desired region of interest. Such scanning may be performed manually or be fully automated. In the latter case the angular attitude of the external laser are motorized which serve to sweep the two angles of the laser to cover the desired region of interest.

Alternatively or additionally, the beam direction module 144 may include an imager/detection module 146 capable of imaging/scanning the cross-sectional area dz at the distance range R. The direction processor 148 may be connectable to the imager/detection module 146 and adapted to process images/scan-data therefrom to detect/identify one or more light scattering objects/surfaces LS at the distance range R. Then, upon detection of suitable scattering object/surface LS, the direction processor 148 computes the needed orientation θ for directing the optical output axis OX to the identified scattering object/surface LS.

In some embodiments the beam direction module 144 is connectable to a user interface UI and is adapted utilize/operate the user interface to display/provide the user/operator with instructions to adjust the orientation of the optical output axis OX to θ. Alternatively or additionally, the external laser module may be associated with a directing (e.g. gimbal) system 350, and the beam direction module 144 is configured to connect/communicate with the directing system 350 to operate it to adjust the optical output axis OX in the desired orientation (e.g. by providing operational directing instructions for operating the directing module 350 accordingly). This enables automatic adjustment of the output optical axis OX towards the scattering object/surface LS.

Thus, the present invention provides a novel IFF system enabling to carry out IFF interrogation of a desired region of interest by interfacing and operation of an external laser transmitter. The invention in some of its aspects advantageously provides a novel technique for encoding identification code of the interrogation in the temporal delay/pattern between a transmitted RF signal and transmitted interrogation laser beam. Additionally, the technique of the invention, according to some of its aspects, allows using a relatively narrow laser beam, emitted from an external laser transmitter, to interrogate a region of interest having a wide cross-section.

The invention claimed is:

1. An Identification Friend or Foe (IFF) system comprising an IFF interrogator for interrogating complementary IFF transponders which are complementary to the IFF interrogator; the IFF interrogator comprises: an RF transceiver module, a control system, and a laser activation interface module operable in conjunction with an independent external laser transmitter, whereby:

(a) the RF transceiver module is configured and operable for transmitting an RF broadcast signal to be received by an IFF transponder being within the interrogation range of said IFF interrogator and for receiving an RF response signal transmitted from the IFF transponder in response thereto;

(b) the laser activation interface module is configured and operable for interfacing with the external laser transmitter to determine activation thereof; and (c) the control system is connectable to said RF transceiver module and to said laser activation interface and configured and operable for:
  i) registering time of transmission of at least one RF broadcast signal by said RF transceiver;
  ii) registering time of transmission of at least one laser beam transmitted by said external laser transmitter;
  iii) determining a time pattern associated with time intervals between said at least one RF broadcast signal and said at least one laser beam, beam said time pattern representing an identification code of the IFF interrogator;

iv) obtaining information from said RF transceiver indicative of RF signals received thereby; and
v) processing said information to identify if said RF signals include an RF response signal from a certain IFF transponder and decode said RF response signal to determine if it encodes the identification code of the IFF interrogator which was represented by the time pattern of the at least one transmitted RF broadcast signal and at least one transmitted laser beam, and thereby determine if said certain IFF transponder was interrogated by said IFF interrogator.

2. The system of claim 1, wherein the control system is configured and operable for carrying out IFF interrogation by:
i) arming said IFF transponders for sensing laser illumination by operating said RF transceiver module to transmit said RF broadcast signal;
ii) utilizing said laser activation interface to determine activation of said external laser transmitter; and
iii) processing information indicative of RF signals received by said RF transceiver to identify therein an RF response signal transmitted by said IFF transponder, which is complementary to the IFF interrogator, in response to detection of said transmitted laser beam from the external laser transmitter by said IFF transponder.

3. The system of claim 1, wherein said laser activation interface comprises an active interface configured and operable for activating said external laser module upon receipt of operational instructions from said control system to determine activation of the laser.

4. The system of claim 3, wherein said active interface comprises a switch interface assembly configured for coupling with said activation switch of the external laser module and operation of said activation switch in response to said operational instructions.

5. The system of claim 1, wherein said laser activation interface comprises a passive interface configured and operable for detecting activation of the external laser.

6. The system of claim 5, wherein said passive laser activation interface comprises one or more of the following:
a mechanical interface configured and operable for mechanically coupling with an activation button of the external laser transmitter to detect activation of the external laser transmitter when said activation button is operated and provide indication of said activation to the control system; and
electromagnetic detection means which can be located in the vicinity of said external laser to detect the electromagnetic transmission of the external laser's electronic power supply when the laser beam is transmitted.

7. The system of claim 1, wherein said control system is configured for controlling transmission time of at least one of said RF broadcast signal and said interrogation laser beam and thereby adjust said time pattern of the time intervals between them, which represents the identification code of the IFF interrogator.

8. The system of claim 1, wherein said external laser module provides a laser beam having a cross-section which is substantially smaller than a cross-sectional dimension of an area that should be covered by the IFF interrogator via illumination at a certain distance range from the external laser module, and intensity of said laser beam is substantially higher than the minimal intensity detection threshold of a transponder system complementary with said IFF interrogator; and wherein the IFF interrogator is associated with a beam scattering directive providing instructions for directing the optical output axis of the external laser module towards light scattering objects/surfaces in the vicinity of said distance range at which said cross sectional dimension that should be covered, so that said area is illuminated by light from said laser beam that is scattered from scattering objects/surfaces.

9. The system of claim 8, wherein at least one of the following:
said scattering surfaces includes a ground surface and said beam scattering directive provides instructions for orienting elevation of the optical output axis of the external laser module downwards such that it intersects the ground in the order of several meters near about said distance range; and
said a beam scattering directive comprises instructions for sweeping the orientation of the optical axis of the external laser transmitter across a certain angular span such that the area that should be covered by the IFF interrogator is effectively illuminate by light scattered from said laser beam during said swiping.

10. The system of claim 8, wherein said beam scattering directive is at least partially implemented by an operation manual of said IFF interrogator which includes information indicative of said instructions.

11. The system of claim 8, wherein said beam scattering directive is at least partially implemented by a beam direction module of the IFF interrogator which is configured and operable to provide instructions for adjustment of an orientation of said optical output axis.

12. The system of claim 11, wherein said beam direction module includes a direction processor configured and operable for computing an orientation angle to set said optical output axis to direct it towards said scattering objects/surfaces and output data indicative of said instructions for adjusting of the orientation of said optical output axis accordingly.

13. The system of claim 12, wherein said direction processor utilizes data indicative of said certain distance range from the from the external laser module and height position of said external laser module and computes an elevation angle of the orientation to direct said optical output axis to intersect the ground at about said distance range such that the ground scatters said laser beam.

14. The system of claim 13, wherein said beam direction module comprises an imager module for imaging said area at said distance range and wherein said direction processor is connectable to said image and is adapted to process images from said imager to detect and identify one or more scattering objects/surfaces at said distance range, and computes said orientation to direct said optical output axis to at least one of said identified scattering objects/surfaces.

15. The system of claim 11, wherein said beam direction module is connectable to a user interface and is adapted for providing said data indicative of the instructions to adjust the orientation of said optical output axis, for display by said user interface to allow an operator of the system to adjust said optical output axis accordingly.

16. The system of claim 11, wherein said external laser module is associated with a directing system capable of adjusting its optical output axis, and wherein the beam direction module is configured and operable for connecting to said directing system for providing operational directing instructions for operating said directing module in accordance with the desired orientation of said optical output axis, thereby enabling automatic adjustment of the output optical axis of said laser beam towards said scattering objects/surfaces.

17. Identification Friend or Foe (IFF) transponder comprising:
   (a) a photo detector configured and operable for detecting light illumination in a certain wavelength band when intensity of said illumination exceeds a certain threshold;
   (b) an RF transceiver module configured and operable for receiving an RF broadcast signal transmitted by an IFF interrogator complementary to said IFF transponder, and for transmitting an RF response signal to be received by said IFF interrogator; and
   (c) a controller connectable to said RF transceiver module and to said photo detector, said controller being adapted to:
      i) process signals received by the RF transceiver to identify receipt of at least one RF broadcast signal from said IFF interrogator;
      ii) process information obtained from said photo detector to identify detection of at least one interrogation laser beam by said photo detector;
      iii) determine a time pattern associated with the time interval between receipt time of said at least one RF broadcast signal and detection time of said at least one interrogation laser beam; and
      iv) operate said RF transceiver for transmitting said RF response signal such that the RF response signal encodes data indicative of said time pattern and wherein the time pattern representing an identification code of the interrogator to which said RF response signal is designated.

18. An Identification Friend or Foe (IFF) method comprising at least one of the following:
   I. carrying out an IFF interrogation by carrying out the following:
      (a) transmitting at least one RF broadcast signal suitable for receipt by a complementary IFF transponder;
      (b) registering a time of transmission of said at least one RF broadcast signal by said RF transceiver;
      (c) operating a laser activation interface module adapted to interface an external laser transmitter, to determine activation of the external laser transmitter for transmitting at least one interrogation laser beam towards an interrogation region of interest;
      (d) determining and registering a time of transmission of said at least one interrogation laser beam by the external laser transmitter;
      (e) determining a time pattern associated with time intervals between transmission times of said at least one RF broadcast signal and said at least one interrogation laser beam, said time pattern representing an identification code of the IFF interrogation;
      (f) obtaining information about RF signals received by an RF receiver;
      (g) processing said information to determine whether the RF signals includes an RF response signal from an IFF transponder; and
      (h) upon detection of an RF response signal from a certain IFF transponder, decoding said RF response signal to determine whether it encodes the identification code of the IFF interrogation which was represented by the time pattern, and thereby determine whether said certain IFF transponder was interrogated by said at least one interrogation laser beam; and
   II. carrying out an IFF transponding by carrying out the following:
      a. processing signals received by an RF transceiver to identify receipt of at least one RF broadcast signal from an IFF interrogator, and register time of said receipt;
      b. processing signals obtained from a photo detector to identify detection of at least one interrogation laser beam by said photo detector, and register time of said detection; and
      c. determining a time pattern associated with the time interval between the time of receipt of said at least one RF broadcast signal and the time of detection of said at least one interrogation laser beam; and transmitting an RF response signal encoding data indicative of said time pattern, said time pattern representing an identification code of the interrogation laser beam of an IFF interrogator to which said RF response signal is designated.

19. An Identification Friend or Foe (IFF) interrogation method for carrying out IFF interrogation, the method comprising:
   providing a beam scattering directive including instructions for directing the optical output axis of an external laser transmitter; wherein said external laser transmitter outputs a laser beam with a cross-sectional area that is substantially smaller than a cross-sectional area to be illuminated at a certain distance range during said IFF interrogation, and intensity of said laser beam is substantially higher than the minimal intensity detection threshold of an IFF transponder system intended to respond to said IFF interrogation,
   wherein said instructions for directing the optical output axis of said external laser transmitter comprise instructions to direct said optical output axis towards light scattering surfaces in the vicinity of said certain distance range such that said cross-sectional area is illuminated by light scattered from said laser beam by said scattering surfaces.

20. The method of claim 19, wherein at least one of the following:
   said beam scattering directive is at least partially implemented by an operation manual of said IFF interrogation which includes information indicative of said instructions;
   said beam scattering directive is at least partially implemented by a beam direction module of an IFF interrogator which is configured and operable to provide one or more of said instructions as operational instructions to directing module of said external laser system to adjust said orientation of the optical output axis; and
   said beam scattering directive comprises instructions for at least one of the following:
      i) instructions for detecting a scattering surface in the vicinity of said distance range;
      ii) instructions for determining the orientation angle to direct said optical output axis towards said scattering surface;
      iii) instructions for directing the optical output axis to the orientation angle(s) θ so as to direct it towards said scattering surface;

iv) instructions for activating, or determining activation of the external laser transmitter after said optical output axis is directed towards said scattering surface; and v) instructions for sweeping the orientation of the optical axis of the external laser transmitter across a certain angular span such that the area that should be covered by the IFF interrogation is effectively illuminated by light scattered from said laser beam during said swiping.

* * * * *